(12) United States Patent
Li et al.

(10) Patent No.: US 8,224,240 B2
(45) Date of Patent: Jul. 17, 2012

(54) METHOD AND APPARATUS FOR IMPLEMENTING BEAM FORMING IN CDMA COMMUNICATION SYSTEM

(75) Inventors: Lilin Li, Shenzhen (CN); Jiying Xiang, Shenzhen (CN); Yanwei Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 797 days.

(21) Appl. No.: 10/580,165

(22) PCT Filed: Nov. 25, 2003

(86) PCT No.: PCT/CN03/00999
§ 371 (c)(1),
(2), (4) Date: May 18, 2006

(87) PCT Pub. No.: WO2005/053182
PCT Pub. Date: Jun. 9, 2005

(65) Prior Publication Data
US 2007/0140177 A1 Jun. 21, 2007

(51) Int. Cl.
*H04B 7/14* (2006.01)
(52) U.S. Cl. ............. 455/25; 455/562.1; 455/67.11; 455/509; 370/338; 370/333; 370/331; 375/144; 342/350; 342/375; 342/354; 342/408
(58) Field of Classification Search ............ 370/328, 370/333, 331; 375/144; 455/67.11, 561, 455/562.1, 69, 456.2, 456.5, 575.7, 432.1–453, 455/509
See application file for complete search history.

(56) References Cited

U.S. PATENT DOCUMENTS 5,710,651 A 1/1998 Logan, Jr.
(Continued)

FOREIGN PATENT DOCUMENTS

KR 2001047506 A 6/2001
(Continued)

OTHER PUBLICATIONS

RU first Office Action with English translation. RU second Office Action with English translation.
(Continued)

*Primary Examiner* — Vladimir Magloire
*Assistant Examiner* — Babar Sarwar
(74) *Attorney, Agent, or Firm* — Husch Blackwell LLP (57) ABSTRACT

The present invention relates to a device for realizing beamforming in CDMA mobile telecommunication system by employing smart antenna technique and method thereof, which forms multiple fixed beams in a sector, and uses multiple fixed beams to form the traffic channel with narrow beams and the common channel with sector beams simultaneously in the same smart antenna system, and overcomes the problem of inconsistency of phrases of respective channels due to the variations of time and temperature without complicated correction technique, thereby improving the capacity and performance of CDMA system with multiple antennas. It solves the problem that the fixed beams in some area correlate with and counteract one another or are greatly reduced due to the correlating addition of the space vectors of each fixed beam when the multiple antenna CDMA system transmits the common channels, and makes the strength of the pilot channel and the traffic channel in corresponding proportion in the coverage area, and improves the signal to noise ratio of receiving signals by the mobile station. By adding an optical transceiver system between the base band and the radio frequency TRX, the base band part can support more sectors. The radio frequency part is very close to the antennas, therefore the power consumption is reduced.

23 Claims, 6 Drawing Sheets

U.S. PATENT DOCUMENTS

| | | |
|---|---|---|
| 6,609,013 B1 | 8/2003 | Oh et al. |
| 2002/0177468 A1* | 11/2002 | Takeuchi et al. ............. 455/562 |
| 2004/0127174 A1* | 7/2004 | Frank et al. ................. 455/101 |
| 2004/0204109 A1* | 10/2004 | Hoppenstein ............. 455/562.1 |
| 2006/0040624 A1* | 2/2006 | Lipka ........................ 455/114.3 |

FOREIGN PATENT DOCUMENTS

| | | |
|---|---|---|
| RU | 2 120 184 | 10/1998 |
| WO | WO 99/40648 | 8/1999 |
| WO | WO 01/56170 | 8/2001 |
| WO | WO 02/49150 | 6/2002 |

* cited by examiner

METHOD AND APPARATUS FOR IMPLEMENTING BEAM FORMING IN CDMA COMMUNICATION SYSTEM

TECHNICAL FIELD OF THE INVENTION

The present invention belongs to the field of mobile communication, and relates to a device for realizing beam-forming in CDMA system and method thereof, Specifically, to a device for realizing beam-forming by using smart antenna technique in CDMA mobile communication.

BACKGROUND OF THE INVENTION

In recent years, CDMA mobile communication system has been developed greatly and employed widely, whose most typical examples are CDMA95, CDMA2000 mobile communication systems commonly used currently in commerce. Compared with mobile communication systems with other mechanisms (such as the time division multiple access TDMA system, the frequency division multiple access FDMA system), the CDMA system has advantages in capacity and service quality. However, because users of CDMA system share one single wideband channel, the common channel interference (CCI) among respective users will be resulted, which limits the capacity of the CDMA system. Furthermore, the rapidly increasing number of mobile communication users and continuously increasing demand on quality of mobile telecommunication require the cells to remain high talking quality while having a great capacity. On the respects of lowering the interference of the system and improving the capacity, the method commonly used is to use the technique of sectoring the cell, too many of sectors, however, will bring about too much handoff load to the system, and will generate pilot frequency pollution, therefore, the existing base station equipments commonly employ there or six sectors. In dense urban area, it is sometimes necessary to further improve the capacity and performance of the system on the basis of the sector base station. When in such situation, some other techniques are needed, such as the multi-carrier technique, the smart antenna technique.

The smart antenna technique is a new kind of mobile communication techniques, including the fixed multi-beam system and the adaptive multi-beam system. The multi-beam handoff system is a system which adds a handoff logic to the fixed multi-beam system so as to facilitate the handoffs among the beam systems. In some documents, the fixed multi-beam system and the multi-beam handoff system are called by a joint name as fixed beam system, the same is true in the present invention.

The smart antenna system controls the direction of the beams by using antenna array, and is capable of tracking the changes of the signals. Compared with all direction antennas and sector antennas, the smart antenna system can improve the gains of antennas via narrow beams, therefore can improve the reception quality of signals greatly.

Theoretically speaking, the smart antenna system with N antenna meta can bring the gain of 10 LogN dB in the condition of adding white Gauss (AWGN) channel, so with the same array transmission power, the smart antenna system can increase the cover area of a base station, for example, when the path loss index n=4.5, and 8 meta array is used, the number of the base stations needed to cover this area will be decreased by 60% compared with the number of base stations using the common antenna system. While maintaining the same cover area, the smart antenna system can improve the performance of the base station system, decrease the transmission power of the meta, and increase the cost benefits of the base station.

The adaptive antenna system forms the transmission and reception beams of the user signals by adopting a certain adaptive rule. Though it has great flexibility and has good performance gains, the system is complicated in realization, and is very difficult to be updated to the smart antenna system based on the existing system.

Figure 1:
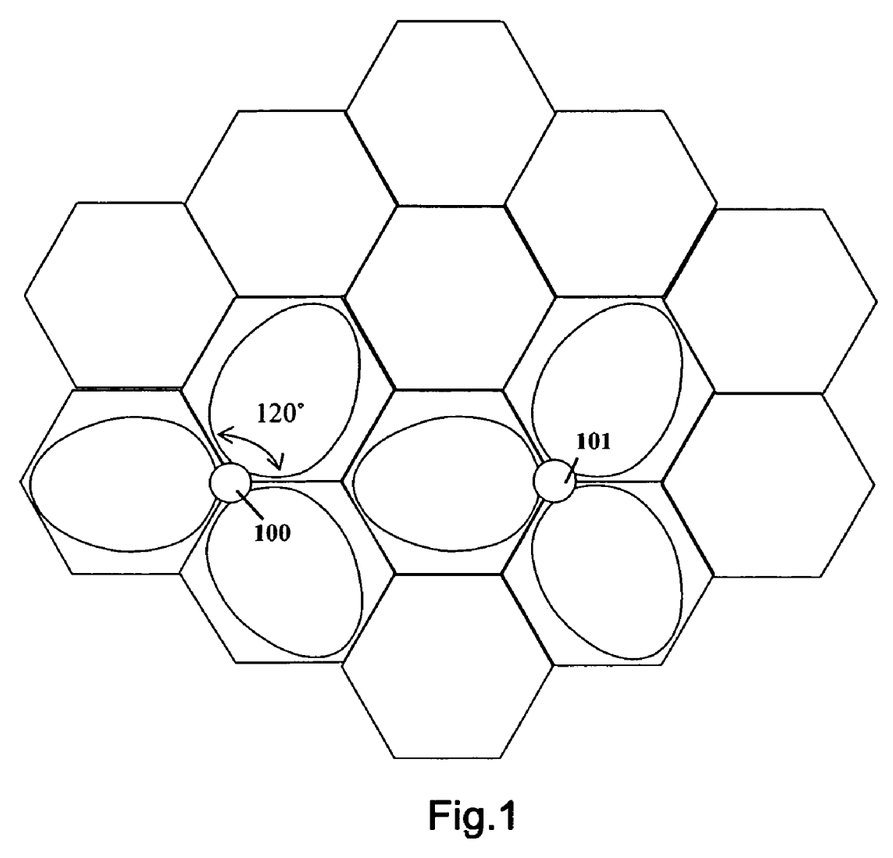
FIG. 1 is the schematic view of network architecture of sector none smart antenna CDMA base station system (in which, the example of sectors are sectors with 120°)
Figure 2:
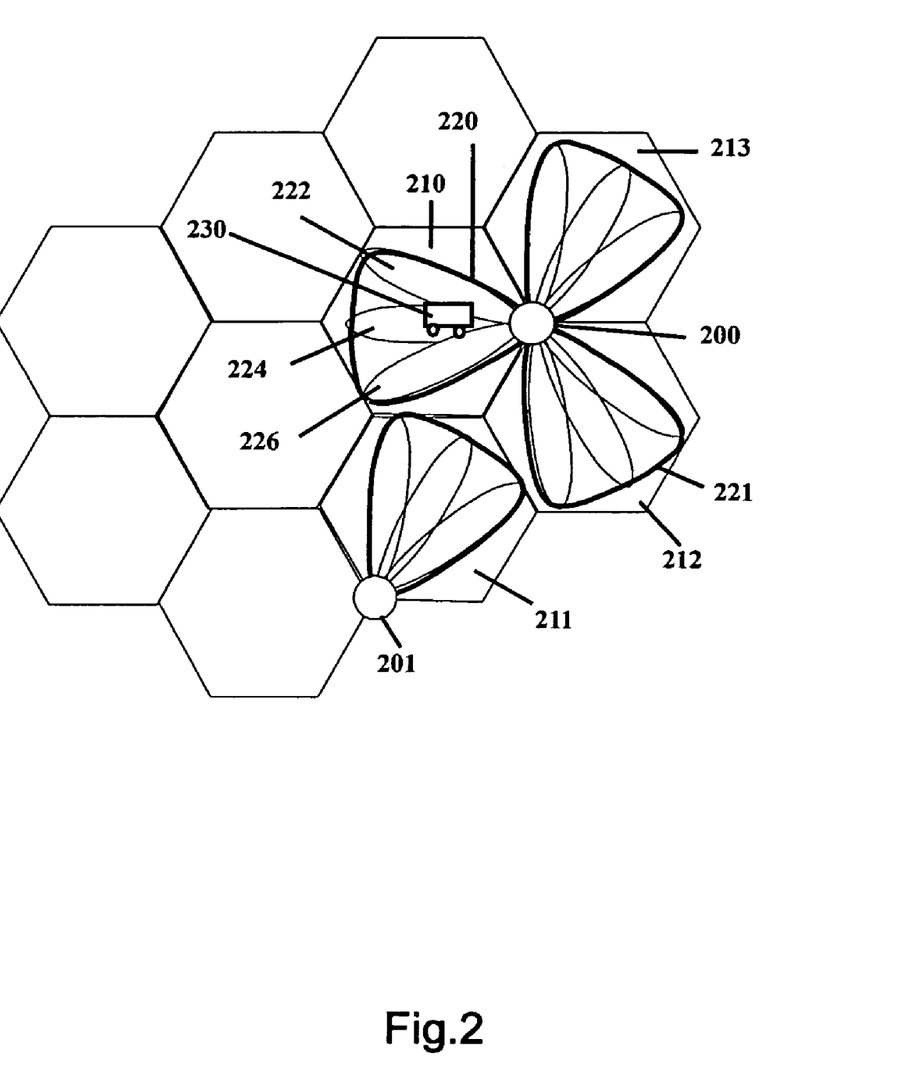
FIG. 2 is the schematic view of network architecture of sector smart antenna CDMA base station system (in which, the example of smart antenna sectors are sectors with 120°, and each sector has 3 fixed beams and 1 sector beam)

Since the fixed beam system in the smart antenna system can further divide the sectors via the narrow beams, the capacity of the smart antenna system is greatly increased compared to the none smart antenna system with sectors. For example, FIG. 1 is a schematic view of a common CDMA base station system with sectors. In FIG. 2, each sector in FIG. 1 is further divided into multiple beams which share one pilot, so the interference and handoff are reduced, and the capacity of the system is increased.

The fixed beam-forming network can use either the digital beam-forming technique or the analog beam-forming technique.

The smart antenna has incomparable advantages in aspects of eliminating interference, enlarging cover area of cells, decreasing system costs, and improving system capacity.

The fixed beam smart antenna system is relatively suitable to be realized in the existing CDMA systems, such as CDMA95, CDMA2000 and WCDMA systems, while the adaptive beam antenna system is comparatively compatible to be realized in the new CDMA systems, such as TD-SCDMA system. The adaptive beam smart antenna system requires more complicated algorithm and correction technique than the fixed beam smart antenna system does.

When using the fixed beam system in CDMA system, it not only needs to form multiple fixed narrow beams for carrying the service information of users, but also the sector beams covering the whole sector, which is used for transmitting the common information of users, such as the information of the pilot channel, the paging channel and the synchronization channel.

Currently, many realizable schemes have been proposed in this research area.

One scheme is to transmit the common information when all the fixed beams are transmitting the traffic channels. However, the pilot channel of each beam, whose vector sum is the strength of the pilot channel of any point in the space, is correlated. When adding the vectors of each beam together to form the pilot channel, the overlays between beams will result in bad addition in some area, and the so-called coverage blind area, where when the mobile stations enter, the talking quality will be decreased greatly, and the call will be even disconnected.

Another scheme is that besides the radio frequency channels and the antennas for generating the fixed narrow beams, another one or group of radio frequency channels and antennas are added to generate beams covering the whole sector for transmitting the common information (such as information of the pilot channel, the paging channel and the synchronization channel). However, this method needs additional high power radio frequency elements and transmission antennas, which will increase the realization cost of the system. In addition, because the pilot channels and the traffic channels pass different radio frequency links in this method, a complicated correction technique will be needed to overcome the problem of time and phrase offsets of the pilot channels and the traffic channels due to the variations of time and temperature. The U.S. Pat. No. 6,094,165 disclosed such a scheme as generating a fixed beam covering the sector by using an additional array antenna.

There is still another scheme in which a certain frequency offset exists between each fixed beam, so as to reduce the bad addition between the beams when synthesizing pilot channels. The related content of it can refer to the US patent No. US2002/0072393, in which the proposed frequency offset is 30~120 Hz, that is, if each sector has 3 beams as commonly used, the carrier offset of this part will reach ±30~120 Hz,I S-97 (the minimum testing criteria for the performance of base station in CDMA95 and CDMA2000) prescribes that the TX frequency tolerance of the base station should <±0.05 ppm, therefore, if the frequency of the base station is 800 MHz, merely the frequency offset of this part will be close to or greatly excess the frequency tolerance of the base station transmission, and therefore the offset of the reception frequency will decrease the demodulation function of the mobile station.

SUMMARY OF THE INVENTION

The purpose of the present invention is to provide a device for realizing beam-forming in CDMA system and method thereof, in which the smart antenna technique is used to form multiple fixed beams in a sector in CDMA system, and multiple fixed beams are used in the same smart antenna system to form traffic channels with narrow beams and common channels with sector beams (such as the pilot channel, the paging channel and the synchronization channel) simultaneously, and the problem of phrase inconsistency of each channel due to the variations of time and temperature is conquered without complicated correction technique, therefore the capacity and performance of CDMA system with multiple antennas are improved. The CDMA system herein comprises but does not limit to such code division multiple access systems as CDMA95, CDMA2000, WCDMA, MC-CDMA and TD-SCDMA systems, all of which use the principle of spreading spectrum.

The present invention is accomplished as follows:

a device for realizing beam-forming in CDMA system:

said device comprises in a forward signal flow, at least a base band system, an optical transceiver system, a transceiver system, an analog fixed beam-forming network, a power amplifier, a transmission filter at a radio frequency front end and an antenna system;

said device at least includes, according to the flow direction of signal in reverse, an antenna system, a reception filter at a radio frequency front end, a low noise amplifier, an analog fixed beam-forming network, a transceiver system, an optical transceiver system and a base band system;

said optical transceiver system, including an optical fiber, an optical interface board close to the base band system and an optical interface board close to the transceiver system, enables the base band system to be placed in the warehouse so as to make the base band system support more sectors, and the radio frequency part close to the antennas, and thereby reduce the power loss;

said optical interface board is used for interconverting the electronic signals and optical signals input.

said base band system is composed of at least one base band chip or/and one base band logic.

in the device composed of the analog fixed beam-forming network, when transmitting forward signals, in order to avoid mutual counteraction among multiple beams forming the common channel, first, the different beams are made to have different time delays in the base band system, therefore, even when carrying the same information they will not correlate with one another; then, after the signals pass through the optical fiber, each of the different beams will pass its corresponding transceiver system, after which, the beams pass the analog fixed beam-forming network, and are amplified, filtered and transmitted by the antenna, and finally are formed to be beams in different directions in space.

said device composed of the analog fixed beam-forming network needs to correct the analog fixed beam-forming network, the power amplifier, the transmission and reception filter at the radio frequency front end, the low noise amplifier, the feedback and the antenna system, as well as the radio frequency cables therebetween.

said analog fixed beam-forming network may be Butler matrix, or Blass matrix, or electromagnetic lens of Lunegberg or Rotman type.

said device comprises a base band system, an optical transceiver system, a transceiver system, an analog fixed beam-forming network formed by batter matrix, radio frequency cables between the transceivers and the analog fixed beam-forming network, radio frequency links including the power amplifier, the transmission filter and the reception filter at the radio frequency front end, the low noise amplifier and the feedback line, and an antenna system;

said optical transceiver system, transceiver system, analog fixed beam-forming network, antenna system and radio frequency links therebetween can be placed on tower or holding pole, so as to make the radio frequency cables therebetween as short as possible and easy to correct, thereby the loss of output power of the power amplifier is reduced, and the coverage area is increased;

the outputs of each sector in said base band system pass the transceiver system respectively, and then pass the analog fixed beam-forming network, thereafter, are reflected to the fixed beams respectively;

the beams formed by said common channels are equivalent to the beams added by the fixed beams.

a device for realizing beam-forming in CDMA system, wherein:

said device comprises in a forward signal flow, a base band system, a digital fixed beam-forming network, an optical interface module, a transceiver system, a power amplifier, a transmission filter at a radio frequency front end and an antenna system;

said device at least comprises, according to the flow direction of signal in reverse, an antenna system, a reception filter at a radio frequency front end, a low noise amplifier, a transceiver system, a digital fixed beam-forming network, and a base band system;

said optical transceiver system, including an optical fiber and an optical interface board close to the base band system and an optical interface board close to the transceiver system, enables the base band system to be placed in the warehouse so as to make the base band system support more sectors, and the radio frequency part close to the antenna, thereby reduce the power loss;

said optical interface board is used for interconverting the electronic signals and optical signals input.

said base band system is composed of at least one base band chip or/and one base band logic.

in the device composed of the digital fixed beam-forming network, when transmitting forward signals, in order to avoid the mutual counteraction among multiple beams forming the common channels, first, the different beams are made to have different time delays in the base band system, therefore, even when carrying the same information, they will not correlate with one another; next, the different beams pass the digital fixed beam-forming network to make themselves have different space directions, then, after passing the optical fiber, the different beams pass their corresponding transceiver systems, after which, they are amplified, filtered, and transmitted through antennas, and finally formed to be beams with different directions in space.

said device composed of the digital fixed beam-forming network needs to correct the transceiver system, the power amplifier, the transmission filter and reception filter at the radio frequency front end, the low noise amplifier, the feedback and the antenna system, as well as the radio frequency cables therebetween.

said device comprises a base band system, a digital fixed beam-forming network, an optical transceiver system, a transceiver system, radio frequency links like the power amplifier, the transmission filter and reception filter at the radio frequency front end, the low noise amplifier, the feedback line etc., radio frequency cables between the transceivers and the radio frequency links, and an antenna system;

said device needs to correct the transceiver system, the radio frequency links including the power amplifier, the transmission filter and the reception filter at the radio frequency front end, the low noise amplifier and the feedback etc., the radio frequency cables between the transceivers and the radio frequency links, the antenna system and the radio frequency cables therebetween;

the outputs of said base band system are reflected to the fixed beams respectively after passing the digital fixed beam-forming network, the beams formed by said common channels are equivalent to the beams added by the fixed beams.

a method for realizing beam-forming in CDMA system, at least comprising the following steps of:

step one: in the base band, reflecting the base band signals of each fixed beam to the sectors of the base band chips;

step two: making the base band signals, which the fixed beams reflecting to the corresponding sectors of their corresponding base band chips, have different time delays in said step one:
the base band signals of each fixed beam can be reflected to the different sectors of the base band chips;
the base band signals of each fixed beam can also be reflected to the same sector of the different base band chips.

in said step one:
when transmitting in a traffic channel of a user, the transmitting can be made only within certain fixed beam where the user locates, that is, the base band signals of the fixed beams for this user are reflected to one certain corresponding sector of the base band chips.

if the user locates among several beams, one or several narrow beams can be selected according to strengths of several user signals of beams received to transmit service data of the user, that is, the base band signals of the user is reflected to one or several corresponding sectors of the base band chips.

in said step one:
when transmitting the common channels of users, the information of the common channels should be transmitted in every fixed beam, that is, the information of the common channels should be reflected to each sector of the base band chips.

said step two:
can be accomplished in the base band chips; and
can also be accomplished by the digital logic components after the base band chips, that is, be accomplished in the base band.

in said step two:
the quantity of the time delay should meet the criterion of making the output signals of each sector in the base band chips not correlate with one another when transmitting the information of the common channels.

when transmitting the common information, the beams at the end at the antennas are made to have different time delays so that they will not correlate with one another when forming the common channel beams, thereby, the problem that the fixed beams in some area correlate with and counteract one another when composing the beams covering the whole sectors is avoided.

The device and method of the present invention solves the problem that the fixed beams in some area correlate with and counteract one another or are greatly reduced due to the correlating addition of the space vectors of each fixed beam when the multiple antenna CDMA system transmits the common channels, and makes the strength of the pilot channel and the traffic channel in corresponding proportion in the coverage area. Compared with prior art, the present invention simplifies the equipment, algorithm and design of the correction schemes, and improves the signal to noise ratio of receiving signals by the mobile station. The adding of an optical transceiver system between the base band and the radio frequency TRX aims to draw the TRX as well as the other radio frequency systems close to the antennas through the optical fiber, so as to enable the base band system to be placed in warehouse (indoor), the base band to support more sectors, the radio frequency to be placed near to the antennas and the power consumption to be reduced.

DETAILED DESCRIPTION OF EMBODIMENTS

The devices and method of the present invention are realized according to the following schemes respectively:

The device of smart antenna beam-forming used in CDMA system is as follows:

The fixed beam-forming network can employ either the digital beam-forming technique, or the analog beam-forming technique. Therefore, according to the different techniques for forming beams, the device of smart antenna fixed beam-forming used in CDMA system can be divided into analog beam-forming device and digital beam-forming device.

In which, the device of smart antenna analog fixed beam-forming used in CDMA system comprises in a forward signal flow, at least a base band system, an optical transceiver system, a transceiver (TRX) system, an analog fixed beam-forming network (such as Butler array), a power amplifier, a radio frequency front end (transmission filter) and an antenna system. And according to the signal flow in reverse direction, it at least includes an antenna system, a radio frequency front end (reception filter), a low noise amplifier, an analog fixed beam-forming network (such as Butler array ), a transceiver (TRX) system, an optical transceiver and a base band system.

When the device of analog fixed beam-forming transmits forward signals, in order to avoid the multiple beams forming the common channels counteracting one another, first, the different beams are made to have different time delays in the base band system, so that even when the different beams carry the same information, they will not correlate with one another, then each of the different beams pass its corresponding optical transceiver system through the optical transceiver system, after which, the beams pass the analog fixed beam-forming network, and are amplified, filtered and transmitted by antennas, and finally are formed to be beams in different directions in space.

The analog fixed beam-forming device only needs to correct the analog fixed beam-forming network (such as Butler array), the power amplifier, the radio frequency front end (transmission filter), the feedback and the antenna system, and the radio frequency cables therebetween. The radio frequency cables of the transceiver system and those between the transceivers and the analog fixed beam-forming network do not need correction. Therefore, the correction of analog fixed beam-forming device is relatively easy.

The analog fixed beam-forming network in the analog fixed beam-forming device can employ either Butler array, or other types of array. For example, the Blass array or the electromagnetic lens of Luneberg or Rotman type can also be used as beam-forming equipments.

The smart antenna digital fixed beam-forming device used in CDMA system comprises in a forward signal flow, at least a base band system, a digital fixed beam-forming part, an optical transceiver, a transceiver system (TRX), a power amplifier, radio frequency front end (transmission filter) and an antenna system. While according to signal flow in reverse direction, it at least includes an antenna system, radio frequency front end (reception filter), a low noise amplifier, a transceiver (TRX) system, an optical transceiver, a digital fixed beam-forming part, and a base band system.

When the digital fixed beam-forming device transmitting forward signals, in order to avoid the multiple beams forming the common channels counteracting one another, first, the different beams are made to have different time delays in the base band system, that is, to ensure the different beams not correlate with one another even when they carry the same information, then, the different beams pass the digital fixed beam-forming network to acquire different space directions, after which, each of the different beams pass its corresponding transceiver system and is amplified, filtered and transmitted by antennas, and finally, the beams are formed to be beams with different directions in space.

The digital fixed beam-forming device needs to correct the transceiver system, the power amplifier, radio frequency front end (transmission filter), the feedback and the antenna system, as well as the radio frequency cables therebetween.

The method of smart antenna beam-forming used in CDMA system of the present invention is as follows:

Step one, in the base band, the base band signals of each fixed beam are reflected to the sectors of the base band chips.

In this step, the base band signals of each fixed beam not only can be reflected to different sectors of the base band chips, but also can be reflected to the same sector of different base band chips, both of which can realize the same function. For example, in the case of reflecting fixed beams to the same sector of different base band chips, if three chips are used, the three beams of the first sector are reflected to the same α sector of the three chips respectively, the three beams of the second sector to the same β sector, and the three beams of the third sector to the same γ sector. In this step, when transmitting in a traffic channel of a user, the transmitting can be made only within certain fixed beam where the user locates, that is, the base band signals of the fixed beams for this user are reflected to one certain corresponding sector of the base band chips.

if the user locates among several beams, one or several narrow beams can be selected according to strengths of several user signals of beams received to transmit service data of the user, that is, the base band signals of the user is reflected to one or several corresponding sectors of the base band chips.

In this step, when transmitting the common channel of users, the information of the common channel should be transmitted in every fixed beam, that is, the information of the common channel should be reflected to each sector of the base band chips.

Step two, the base band signals of each fixed beam reflected to the corresponding sectors of the corresponding base band chips are made to have different time delays. This step is also accomplished in the base band chips, and of course, it can also be accomplished by the digital logic components after the base band chips, that is, be accomplished in the base band.

The volume of the time delay should meet the criterion of making the output signals of each sector of the base band chips not correlate with one another when transmitting the common channel information.

The object of this step is to make the base band signals of all the fixed beams forming the common channel of the whole sector not correlate with one another, therefore the problem that the beams in some area correlate with and counteract one another or are greatly reduced due to the correlating addition of the space vectors of the respective beams is solved.

The method of multiple antenna beam-forming used in CDMA system is also adaptable to multiple antenna analog fixed beam-forming device of CDAM system, and multiple antenna digital fixed beam-forming device of CDMA system.

In connection with appended drawings the embodiments of the technical schemes of the present invention will be further described below in detail:

FIG. 1 shows a schematic view of structure of a sector cellular mobile telecommunication system. Due to the limitation of mobile frequency resource, the mobile telecommunication system with cellular structure is acknowledged and widely used as the networking form of land mobile telecommunication base station system. According to the difference of traffic in the coverage area, the cellular base station can employ all direction base station, and also can employ sector base station. In FIG. 1, the base station 100 and 101 is a base station system with a structure of three sectors, and each sector has a coverage area of 120°. The actual system can appropriately change the size and quantity of sectors according to the quantity of traffic.

FIG. 2 shows a schematic view of structure of a sector cellular mobile telecommunication system employing the smart antenna system. Compared with the sector none smart antenna cellular mobile system, this system can improve its capacity and reduce the number of the base stations. In drawings, 200 refers to a three sector base station employing the smart antenna system, 201 refers to a neighboring base station of 200 with one single sector employing the smart antenna system. Each base station sector includes several pre-generated fixed beams. Taking sector 210 of the base station 200 for example, 222, 224, 226 are fixed beams, a certain extent of overlay is required between two neighboring fixed beams so as to avoid blind coverage area, thereby to ensure that the beams can cover the whole sector. In actual system design, the number of the fixed beams in each sector can be set freely according to the quantity of the traffic and the size of the sector. When user 230 moves in sector 210, the base station selects, after comparing the reception signals from fixed beams 222, 224 and 226, one beam with the best signal quality or several beams with relatively good quality as reception beams, in the latter case, the signals of the selected beams are combined together. The time delay of the base band is adjusted in order to make the time delays output by the base band different, so that the beams will not correlate with one another even when they output the same signals, thereby the time delays of fixed beams 222, 224 and 226 at the end of antennas are also different, thus, the problem that the signals of beams in some area are very weak due to the correlating addition of the beams can be avoided, and a sector beam covering the whole sector can be formed, as shown in FIG. 220. This sector beam is mainly for but not limited to transmitting the common information of users, such as the pilot information, and of course, it can also transmit traffic information and receive user information. When the user moves around the boundaries between sectors 210, 211 and 212, the base stations 200 and 201 support the handoff function between sectors, with operation principle similar to that of the sector none smart antenna system.

Figure 3:
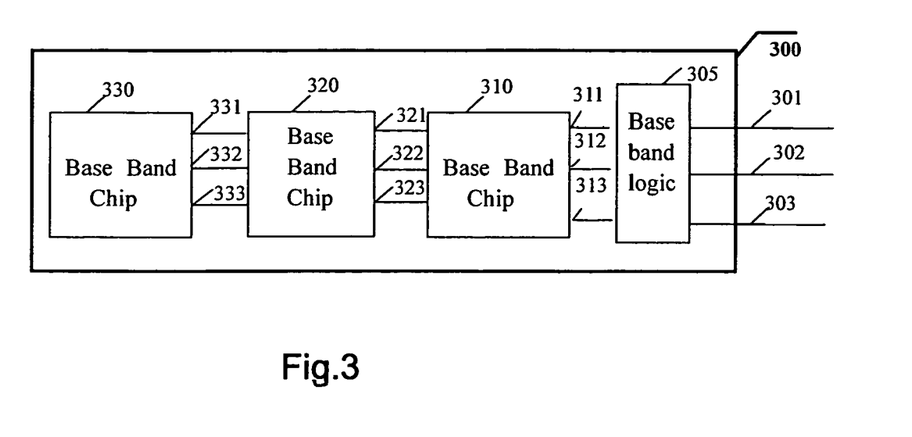
FIG. 3 is a block diagram of an embodiment of the base band system.
Figure 4A:
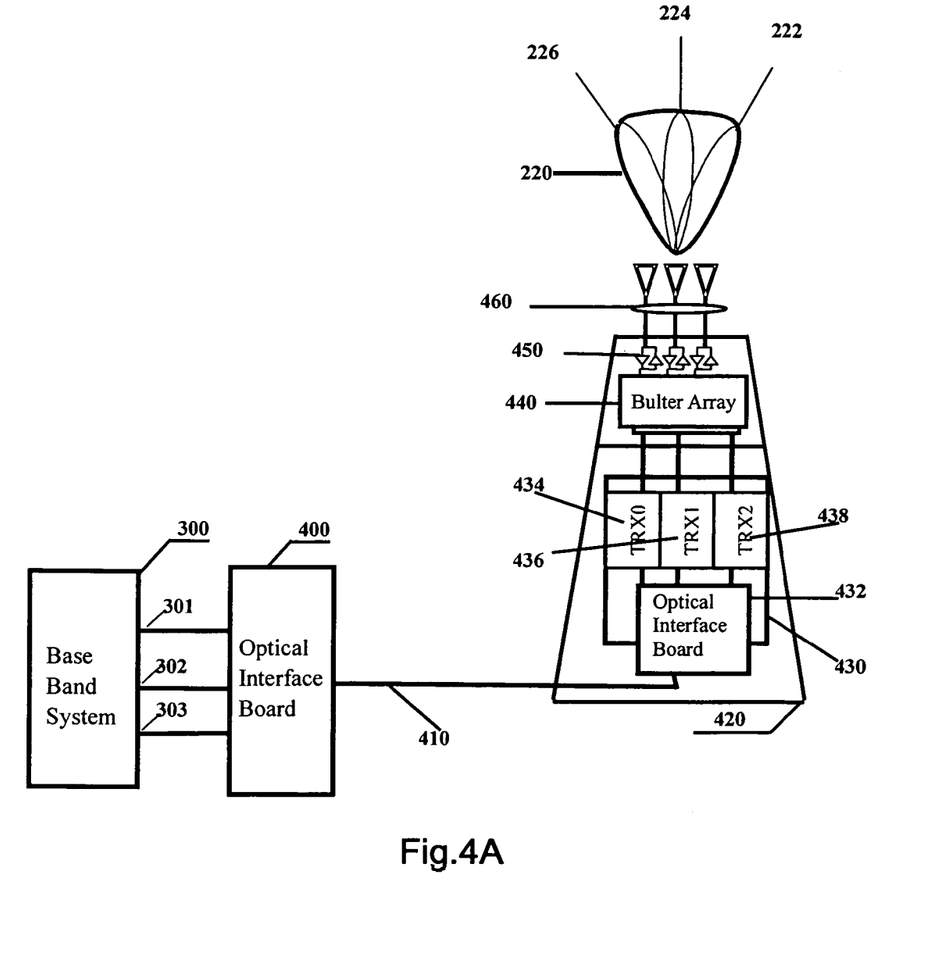
FIG. 4A is a block diagram of a sector smart antenna system employing analog fixed beam-forming network architecture (such as Butler array)
Figure 4B:
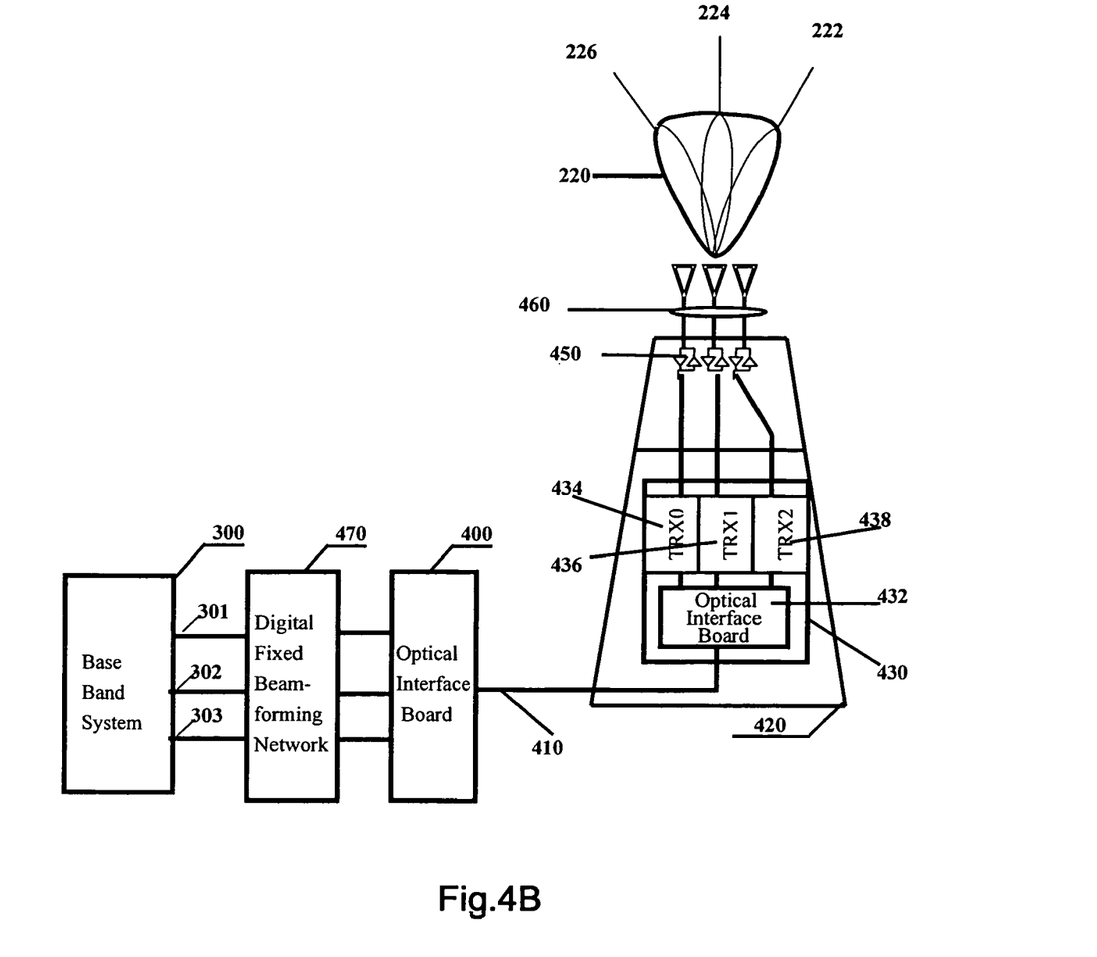
FIG. 4B is a block diagram of a sector smart antenna system employing digital fixed beam-forming architecture.

For the present invention, FIG. 3 is a block diagram of an embodiment of the base band system, FIG. 4A is a block diagram of the sector smart antenna system employing the analog fixed beam-forming network (such as Bulter array), FIG. 4B is a block diagram of the sector smart antenna system employing digital fixed beam-forming architecture.

It is well known that, in CDMA system, the pseudo random code used in pilot spreading spectrum has characters of good self-related and correlated, that is, the self-related value of the pseudo random code itself is very high. However, when the pseudo random code is related to another pseudo random code which is equal to or has one more chip than itself, its related value is very low, almost near to zero. To employ this character of CDMA system, the beams at the end of the antennas can be made to have different time delays when transmitting the common information so that they will not correlate with one another when forming the common channel beams (when the correlation value is near to zero, the beams will not correlate with one another naturally), therefore, the problem that the fixed beams correlate with and counteract one another when composing beams for covering the whole sector is avoided. For example, we can design beam 224 as the normal pilot offset of sector 210, and design the normal offset as $t_{224}$, the time of beam 226 is 1~5 chips ahead of beam 224, and the time of beam 222 is 1~5 chips later than beam 224. If a concrete time $\Delta t$ is chosen from 1~5 chips, the transmission time offset of beam 226 is $t_{226}=t_{224}-\Delta t$, and the transmission time offset of beam 222 is $t_{222}=t_{224}+\Delta t$.

In which, the time of each chip is different a little in different CDMA systems. In CDMA95 and CDMA2000, the time of one chip is equivalent to 1/1.2288 MHz=0.814 us, in TD-SCDMA, it is equivalent to 1/1.28 MHz=0.78 us, in WCDMA, it is equivalent to 1/3.84 MHz=0.26 us. The time of five chips is equivalent to be five times as the time of one chip, for example, in CDMA95 and CDMA2000, the time of 5 chips is equivalent to 4.07 us.

In FIG. 4A, 4B, the corresponding base band outputs of beams 226, 224 and 222 are made to be 301, 302 and 303 respectively by employing the analog fixed beam forming network or the digital fixed beam-forming technique. Because the time delays (ns level) of the radio frequency link from the outputs 301, 302, 303 of the base band 300 to the antenna system 460 can be ignored compared to the time delay of chip level(us level), the time offsets corresponding to the outputs 301, 302, 303 of the base band 300 can be considered as $t_{301}=t_{226}=t_{224}-\Delta t=t_{302}-\Delta t$, $t_{302}=t_{224}=t_{302}t_{303}=t_{222}=t_{224}+\Delta t=t_{302}+\Delta t$, that is, with reference to the output 302 of the base band 300, the output 301 of the base band system 300 is $\Delta t$ ahead of the output 302 of the base band system 300, and the output 303 of the base band system 300 is $\Delta t$ later than the output 302 of the base band system 300, in which $\Delta t$ is one certain time delay selected from 1~5 chips as mentioned above. The relative offset of output time between outputs 301, 302, 303 of the base band system 300 can be accomplished in the base band chip, and of course, can also be accomplished in the digital logic component after the base band chip. This will be described in detain below with reference to FIG. 3.

FIG. 3 is a block diagram of the base band system, which only shows the block diagram of the base band system 300 of sector 210 in the base station 200. It is supposed that the base band system of sector 210 is composed of base band chips 310, 320, 330 and a base band logic 305. This is only one concrete example of embodiments, and in reality, the number of the base band chips can range from one to many. The outputs 331, 332, 333 of the base band chip 330 correspond to the outputs of three sectors α, β, γ in the base band chip 330 respectively, the outputs of 321, 322, 323 of the base band chip 320 correspond to the outputs of three sectors α, β, γ in the base band chip 320 respectively, and the outputs of 311, 312, 313 of the base band chip 310 correspond to the outputs of three sectors α, β, γ in the base band chip 310 respectively. Because the base band chips 330, 320, 310 are step-connected together, the outputs 331, 332, 333 of sector α, β, γ of the base band chip 330 are step-connected to the inputs of sector α, β, γ of the base band chip 320 respectively, the output 321, 322, 323 of sector α, β, γ of the base band chip 320 are step-connected to the inputs of sector α, β, γ of the base band chip 310 respectively, that is, the sector α, β, γ of the base band chips 330, 320, 310 are step-connected together correspondingly.

In said step one of the present invention, with reference to FIG. 4A, 4B, by employing the analog fixed beam-forming network or the digital fixed beam-forming technique, the outputs of the base band system 300 respectively corresponding to the three beams 226, 224 and 222 are made to be 301, 302 and 303, which correspond to the outputs 311, 312 and 313 of sectors α, β, γ of the base band chip 310 respectively, thereby the base band signals 301, 302, 303 of fixed beams 226, 224 and 222 are reflected to sectors α, β, γ of the base band chip respectively.

In this step, when transmitting in a traffic channel of a user, the transmitting can be made only within certain fixed beam where the user locates, that is, the base band signals of the fixed beams for this user are reflected to one certain corresponding sector of the base band chips. For example, the traffic channel of a user can be transmitted in the fixed beam 226, its corresponding base band output is 301, and correspondingly, it is reflected to the sector α of the base band chips. Surely, if the user locates among several beams, one or several narrow beams can be selected according to strengths of several user signals of beams received to transmit service data of the user, that is, the base band signals of the user is reflected to one or several corresponding sectors of the base band chips.

In this step, if what is transmitted is the common channel of users, this channel information should be transmitted in every fixed beam, that is, the information of the common channel should be reflected to every sector of the base band chips.

Said step two of the present invention, in which base band signals reflected from the fixed beams to the corresponding sectors of the base band chips are made to have different time delays, can be accomplished both in the base band chips and by the digital logic components after the base band chips.

In the situation that the time delay is accomplished in the base band chips, the base band logic 305 is dispensable. As described above, the time delay of the outputs 301, 302 and 303 of the base band 300 can be $t_{301}=t_{302}-\Delta t$, $t_{303}=t_{302}+\Delta t$, in which, $\Delta t$ is one certain time delay selected from 1~5 chips as recited in the above paragraphs, its time precision may be between 1 to 2 chips, for example, it may be one chip, or one and a half chip. Without base band logic 305, at this time, the time offsets of the outputs 311, 312, 313 of the base band chip 310 are consisted with that of the outputs 301, 302, 303 of the base band 300 respectively. Suppose the processing time delay of the base band chips is $\tau$, then time offsets of the outputs 321, 322 and 323 of the base band chip 320 are $t_{321}=t_{302}-\Delta t-\tau$, $t_{322}=t_{302}-\tau$ and $t_{323}=t_{302}+\Delta t-\tau$ respectively; and the time offsets of the outputs 331, 332, 333 of the base band chip 330 are $t_{331}=t_{302}-\Delta t-2\tau$, $t_{332}=t_{302}-2\tau$ and $t_{333}=t_{302}+\Delta t-2\tau$ respectively.

The method for performing time delay by the base band logic 305 is similar to the method for performing time adjustment in chips. But, when performing time delay by the base band logic 305, the output time offset of base band chips can only be delayed, but not advanced, moreover, the processing time delay of the base band logic 305 itself also need to be considered. Performing time delay by the base band logic 305 is also in the range of protection of the present invention.

The volume of the time delay should meet the criterion of making the signals at the output end of each sector of the base band not correlate with one another when transmitting the common channel information.

The purpose of this step is to make the base band signals of the fixed beams forming the common channel of the whole sector not correlate with one another, therefore solving the problem that signals in some area will correlate with and counteract one another or be reduced greatly due to the correlating addition of the beam space vectors when forming the common channel.

It should be noted specially that: the "sector" referred in said step one as the fixed beams reflected to the corresponding "sectors" of the base band chips and the "sector" referred in said step two as forming the common channel of the whole "sector" have different meanings. The former refers to the corresponding sectors in the base band chips, herein is the area covered by the narrow beams, such as 222, 224, 226 shown in FIG. 2; the latter refers to 220, the area covered by the common channel composed by all the fixed beams.

The method of the present invention of multiple antenna common beam-forming used in CDMA system is also adaptable to the multiple antenna analog fixed beam-forming device of CDMA system and the multiple antenna digital fixed beam-forming device of CDMA system.

FIG. 4A shows the smart antenna analog fixed beam-forming device used in CDMA system which comprises a base band system 300, an optical transceiver system composed of an optical interface board 400 close to the base band system and an optical interface board 432 close to the transceiver TRX, and an optical fiber 410 between optical interface board 400 and 432, a transceiver (TRX) system composed of 434, 436 and 438, an analog fixed beam-forming network (such as Butler array) 440, radio frequency links 450 including a power amplifier, a radio frequency front end (transmission filter, reception filter), a low noise amplifier and a feedback line etc., and an antenna system 460. Because the analog fixed beam-forming network only needs to correct the analog fixed beam-forming network 440, radio frequency link 450 between the analog fixed beam-forming network 440 to the antenna system 460, the antenna system 460, and the radio frequency cables therebetween, the analog fixed beam-forming network 440, antenna system 460 and the radio frequency link 450 between them can be placed on the tower or the holding pole 430, so as to make the radio frequency cables therebetween as short as possible. Thus, the correction becomes easy, and the loss generated in power amplifier outputting power is reduced, therefore the coverage area is increased. The radio frequency cables of the transceiver system 434, 436 and 438 and the radio frequency cables between the above transceiver system to the analog fixed beam-forming network 440 do not need correction.

The outputs 301, 302 and 303 of the base band 300 in the analog fixed beam-forming device 4A pass the optical transceiver system composed of the optical interface board 400 close to the base band system, the optical fiber 410 and the nearby optical interface board 432 of the transceiver TRX, then pass the TRX0, TRX1, TRX2 of transceiver (TRX) system 434, 436 and 438, and pass the analog fixed beam-forming network 440, and are finally reflected to beams 226, 224, 222 respectively. The beams formed by the common channel is equivalent to beam 220 added by the fixed beams 226, 224, 222.

FIG. 4B shows the smart antenna digital fixed beam-forming device used in CDMA system, which comprises a base band system 300, a digital fixed beam-forming network 470, an optical transceiver system composed of an optical interface board 400 close to the base band system and an optical interface board 432 close to the transceiver TRX, and an optical fiber 410 between the optical interface boards 400 and 432, a transceiver (TRX) system 434, 436 and 438, radio frequency links 450 including a power amplifier, a radio frequency front end (transmission filter, reception filter), a low noise amplifier and a feedback line etc., radio frequency cables between transceivers 434, 436 and 438 and radio frequency links 450, and an antenna system 460. In the digital fixed beam-forming device, the radio frequency cables of the transceivers (TRX) 434, 436 and 438, the radio frequency links 450 including the power amplifier, the radio frequency front end (transmission filter, reception filter ), the low noise amplifier and the feedback line etc., the radio frequency cables between transceivers 434, 436 and 438 and radio frequency links 450, and the antenna system 460 as well as the the radio frequency cables therebetween.

The outputs 301, 302 and 303 of the base band 300 in the digital fixed beam-forming device 4B are reflected to the beams 226, 224, 222 respectively after passing the digital fixed beam-forming network 470. The beams formed by the common channel is equivalent to beam 220 added by the fixed beams 226, 224, 222.

The smart antenna fixed beam system can further divide the sectors via the narrow beams, by which, compared with the sector none smart antenna system, the capacity of the system is greatly improved. The sharing of one pilot among several beams helps to reduce the interference and frequent handoffs, therefore, the capacity of the system is improved. As shown in FIG. 2, the single beam sector in FIG. 1 is divided into a sector with 3 beams sharing one pilot, so the capacity of the system is 200%~300% of the original single beam sector.

Figure 5:
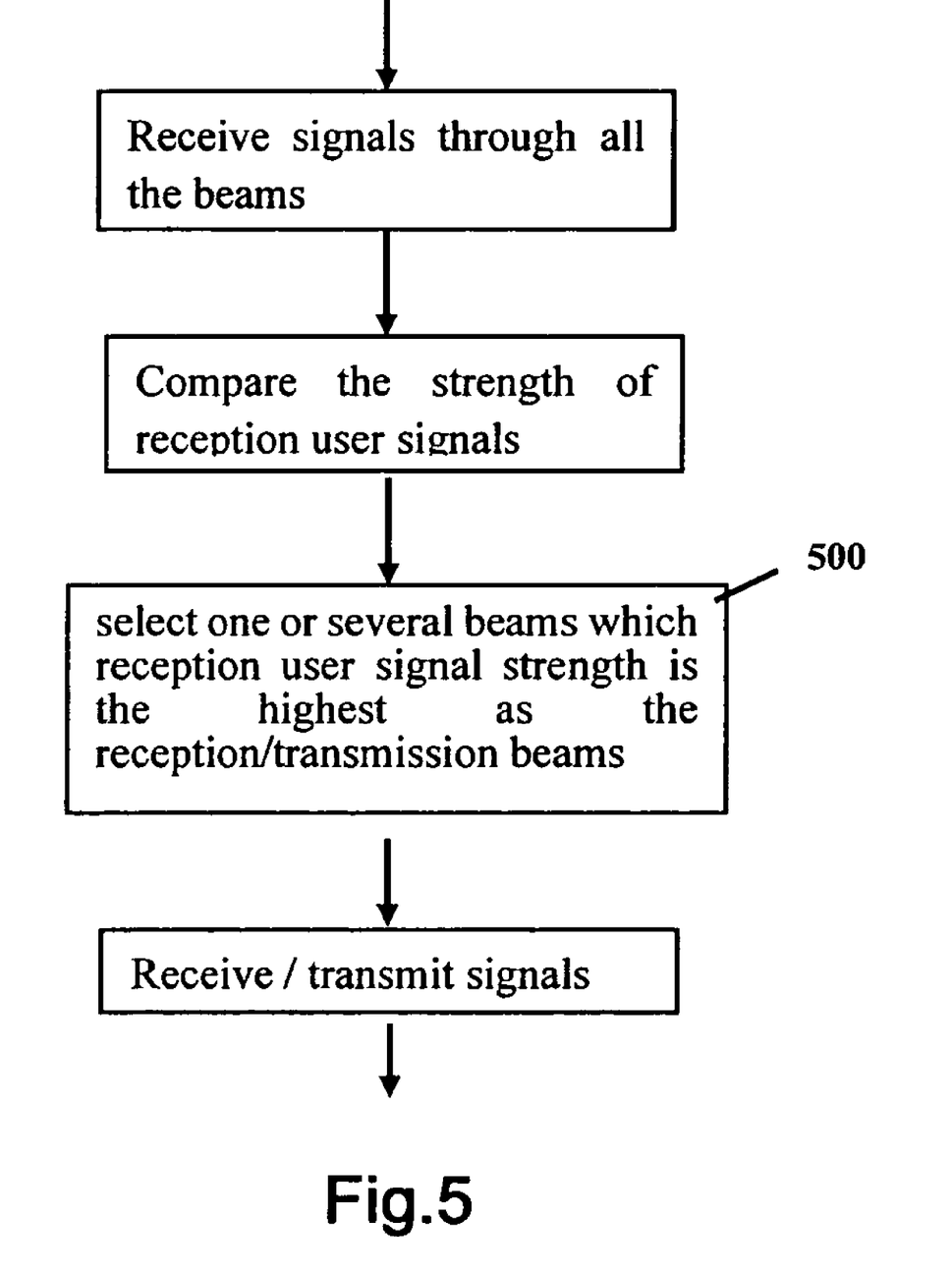
FIG. 5 is the flowchart of selecting narrow band fixed beams for receiving and transmitting user signals in sector smart antenna system.

FIG. 5 is the flowchart for selecting narrow band fixed beams for receiving and transmitting user signals in the sector smart antenna system, which presents an operation flowchart for selecting beams according to the method of comparing the reception signal strength of users. First, receive user signals by all the beams, then compare the strength of reception user signals of each beam, select one or several beams which have the strongest user signals, then receive/transmit the signals. As shown in FIG. 2, when user 230 moves in sector 210, the base station selects, by comparing the reception signals of the fixed beams 222, 224 and 226, one beam with the best signal quality or several beams with comparatively good signal quality as reception beams, then combines the signals of each beam together.

Although the present invention takes the situation where 3 antennas generate 3 beams in each sector as a preferred embodiment, any system formed according to the principle of the present invention by employing more than one antenna and beam for each sector falls into the protection of the present invention.

The aforesaid is the description of the preferred embodiments of the present invention, the ordinary skilled persons in the art should understand that various modifications and changes all fall into the principle of the present invention and the coverage of the appended claims.

What is claimed is:

1. A device for realizing beam-forming in CDMA system, said device comprising:
    in a forward signal flow, at least a base band system, an optical transceiver system, transceiver systems, an analog fixed beam-forming network, a power amplifier, a transmission filter of a radio frequency front end and an antenna system; and
    in a reverse signal flow, at least the antenna system, a reception filter of a radio frequency front end, a low noise amplifier, the analog fixed beam-forming network, the transceiver systems, the optical transceiver system and the base band system;
    wherein, said base band system comprises at least one base band chip, and the at least one base band chip have a plurality of sectors;
    wherein, the optical transceiver system comprises first optical interface board close to the base band system, second optical interface board close to the transceiver systems, and an optical fiber between the first optical interface board and the second optical interface board, the first and second optical interface board being used to interconvert electronic signals and optical signals input; and the optical transceiver system is configured to enable the base band system be placed in a warehouse so as to make the base band system support the plurality of sectors, and to enable a radio frequency part close to the antenna so as to reduce power loss;
    wherein, the base band system is configured to, when transmitting forward signals on a common channel, make different beams be reflected to the sectors of the at least one base band chip to have different time delays, so that the different beams are not coherent with one another even when the different beams carry same information.

2. The device for realizing beam-forming in CDMA system of claim 1, wherein:
    said base band system comprises at least one base band logic.

3. The device for realizing beam-forming in CDMA system of claim 2, in said device comprising the analog fixed beam-forming network, when transmitting forward signals, wherein:
    the base band system is configured to make different beams to have different time delays, so that the different beams do not correlate with one another even when the different beams carry same information;
    the optical fiber is configured to make the signals to pass through the optical fiber;
    the transceiver systems are configured to make the different beams to pass different transceiver systems respectively;
    the analog fixed beam-forming network is configured to, after the different beams pass their corresponding transceiver systems, make the different beams pass through; and
    the antenna system is configured to amplify, filter, and transmit the different beams through antennas to forme beams with different directions in space, in order to avoid mutual counteraction among multiple beams forming a common channel.

4. The device for realizing beam-forming in CDMA system of claim 2, wherein:
    said device comprising the analog fixed beam-forming network is configured to correct the analog fixed beam-forming network, the power amplifier, the transmission and reception filter of the radio frequency front end, the low noise amplifier, a feedback line and the antenna system, and radio frequency cables therebetween.

5. The device for realizing beam-forming in CDMA system of claim 2, wherein:
    said analog fixed beam-forming network is Butler matrix, or Blass matrix, or electromagnetic lens of the Lunegberg or Rotman type.

6. The device for realizing beam-forming in CDMA system of claim 2, wherein:
    said device further comprises: the base band system, the optical transceiver system, the transceiver system, an analog fixed beam-forming network formed by batter matrix, radio frequency cables between the transceiver systems and the analog fixed beam-forming network, radio frequency links including the power amplifier, the transmission filter and the reception filter of the radio frequency front end, the low noise amplifier and a feedback line, and the antenna system;
    said optical transceiver system, transceiver systems, analog fixed beam-forming network, antenna system and radio frequency links therebetween are configured to be placed on a tower or a holding pole, so as to make the radio frequency cables therebetween as short as possible,
    outputs of each sector of said base band system is configured to pass the transceiver systems respectively, then pass the analog fixed beam-forming network, and thereafter reflect to the fixed beams respectively; and
    beams formed in said common channel are configured to be equivalent to beams added by the fixed beams.

7. The device for realizing beam-forming in CDMA system of claim 1, in said device comprising the analog fixed beam-forming network, when transmitting forward signals, wherein:
    the base band system is configured to make different beams to have different time delays;
    the optical fiber is configured to make the signals to pass through the optical fiber;
    the transceiver systems are configured to make the different beams to pass different transceiver systems respectively;
    the analog fixed beam-forming network is configured to, after the different beams pass their corresponding transceiver systems, make the different beams pass through; and
    amplify, filter, and transmit the different beams through antennas to forme beams with different directions in space, in order to avoid mutual counteraction among multiple beams forming a common channel.

8. The device for realizing beam-forming in CDMA system of claim 1, wherein:
said device comprising the analog fixed beam-forming network is configured to correct the analog fixed beam-forming network, the power amplifier, the transmission and reception filter of the radio frequency front end, the low noise amplifier, a feedback line and the antenna system, and radio frequency cables therebetween.

9. The device for realizing beam-forming in CDMA system of claim 1, wherein:
said analog fixed beam-forming network is Butler matrix, or Blass matrix, or electromagnetic lens of the Lunegberg or Rotman type.

10. The device for realizing beam-forming in CDMA system of claim 1, wherein:
said device further comprises: the base band system, the optical transceiver system, the transceiver systems, an analog fixed beam-forming network formed by batter matrix, radio frequency cables between the transceiver systems and the analog fixed beam-forming network, radio frequency links including the power amplifier, the transmission filter and the reception filter of the radio frequency front end, the low noise amplifier and a feedback line, and the antenna system;
said optical transceiver system, transceiver systems, analog fixed beam-forming network, antenna system and radio frequency links therebetween are configured to be placed on a tower or a holding pole, so as to make the radio frequency cables therebetween as short as possible;
outputs of each sector of said base band system is configured to pass the transceiver systems respectively, then pass the analog fixed beam-forming network, and thereafter reflect to the fixed beams respectively; and
beams formed in said common channel are configured to be equivalent to beams added by the fixed beams.

11. A device for realizing beam-forming in CDMA system, said device comprising:
in a forward signal flow, at least a base band system, a digital fixed beam-forming network, an optical transceiver system, transceiver systems, a power amplifier, a transmission filter of a radio frequency front end and an antenna system;
in a reverse signal flow, at least the antenna system, a reception filter of a radio frequency front end, a low noise amplifier, the transceiver systems, the optical transceiver system, the digital fixed beam-forming network, and the base band system;
wherein, said base band system comprises at least one base band chip, and the at least one base band chip have a plurality of sectors;
wherein, said optical transceiver system comprises a first optical interface board close to the base band system, a second optical interface board close to the transceiver systems, and an optical fiber between the first optical interface board and the second optical interface board, the first and second optical interface board being used to interconvert electronic signals and optical signals input; and the optical transceiver system is configured to enable the base band system be placed in a warehouse so as to make the base band system support the plurality of sectors, and to enable a radio frequency part close to the antenna so as to reduce the power loss; and
wherein, the base band system is configured to, when transmitting forward signals on a common channel, make different beams be reflected to the sectors of the at least one base band chip to have different time delays, so that the different beams are not coherent with one another even when the different beams carry same information.

12. The device for realizing beam-forming in CDMA system of claim 11, wherein:
said base band system comprises at least one base band logic.

13. The device for realizing beam-forming in CDMA system of claim 12, in said device comprising the digital fixed beam-forming network, when transmitting forward signals, wherein:
the base band system is configured to make different beams to have different time delays, so that the different beams do not correlate with one another even when the different beams carry same information;
the digital fixed beam-forming network is configured to make the different beams pass through to make the different beams themselves have different space directions;
the transceiver systems are configured to, after passing through the optical fiber, make the different beams to pass different transceiver systems;
the antenna system is configured to, after the different beams pass their corresponding transceiver systems, amplify, filter, and transmit the different beams through antennas to form beams with different directions in space, in order to avoid mutual counteraction among multiple beams forming a common channel.

14. The device for realizing beam-forming in CDMA system of claim 12, wherein:
said device comprising the digital fixed beam-forming network is configured to correct the transceiver systems, the power amplifier, the transmission and reception filters of the radio frequency front end, the low noise amplifier, a feedback line and the antenna system, and the radio frequency cables therebetween.

15. The device for realizing beam-forming in CDMA system of claim 12, wherein:
said device further comprises: the base band system, the digital fixed beam-forming network, the optical transceiver system, the transceiver systems, radio frequency links including the power amplifier, the transmission and reception filters of the radio frequency front end, the low noise amplifier, and a feedback line, radio frequency cables between the transceiver systems and the radio frequency links, and the antenna system;
said device is configured to correct the transceiver systems, the radio frequency links including the power amplifier, the transmission filter and reception filter of the radio frequency front end, the low noise amplifier and the feedback line, the radio frequency cables between the transceiver systems and the radio frequency links, the antenna system and the radio frequency cables between the above systems;
outputs of said base band system are configured to reflect to the fixed beams respectively after passing the digital fixed beam-forming network; and
beams formed in said common channel are configured to be equivalent to beams added by the fixed beams.

16. The device for realizing beam-forming in CDMA system of claim 11, in said device comprising the digital fixed beam-forming network, when transmitting forward signals, wherein:
the base band system is configured to make different beams to have different time delays;

the digital fixed beam-forming network is configured to make the different beams pass through to make the different beams themselves have different space directions;

the transceiver systems are configured to, after passing through the optical fiber, make the different beams to pass different transceiver systems;

the antenna system is configured to, after the different beams pass their corresponding transceiver systems, amplify, filter, and transmit the different beams through antennas to form beams with different directions in space, in order to avoid mutual counteraction among multiple beams forming a common channel.

17. The device for realizing beam-forming in CDMA system of claim 11, wherein:

said device comprising the digital fixed beam-forming network is configured to correct the transceiver systems, the power amplifier, the transmission and reception filters of the radio frequency front end, the low noise amplifier, a feedback line and the antenna system, and the radio frequency cables therebetween.

18. The device for realizing beam-forming in CDMA system of claim 11, wherein:

said device further comprises: the base band system, the digital fixed beam-forming network, the optical transceiver system, the transceiver systems, radio frequency links including the power amplifier, the transmission and reception filters of the radio frequency front end, the low noise amplifier, and a feedback line, radio frequency cables between the transceiver systems and the radio frequency links, and the antenna system;

said device is configured to correct the transceiver systems, the radio frequency links including the power amplifier, the transmission filter and reception filter of the radio frequency front end, the low noise amplifier and the feedback line, the radio frequency cables between the transceiver systems and the radio frequency links, the antenna system and the radio frequency cables between the above systems;

outputs of said base band system are configured to reflect to the fixed beams respectively after passing the digital fixed beam-forming network; and beams formed in said common channel are configured to be equivalent to beams added by the fixed beams.

19. A method for realizing beam-forming in CDMA system, at least comprising the following steps of:

step one: in a base band, reflecting base band signals of each fixed beam to sectors of base band chips;

step two: making the base band signals of the fixed beams reflected to corresponding sectors of the base band chips have different time delays when transmitting forward signals on a common channel;

wherein, said step two is:

setting a quantity of the time delays, such that output signals of each sector of the base band chips do not correlate with one another when transmitting common channel information; and when transmitting the common channel information, making beams at ends of antennas have different time delays to make the formed common channel beams not correlate with one another, so as to avoid beams correlating with and counteracting one another in some area when fixed beams compose the beams covering a whole sector.

20. The method for realizing beam-forming in CDMA system of claim 19, wherein, in said step one:

reflecting the base band signals of each fixed beam to different sectors of the base band chips; or reflecting the base band signals of each fixed beam to same sectors of the different base band chips.

21. The method for realizing beam-forming in CDMA system of claim 19, wherein, in said step one:

when transmitting in a traffic channel of a user, transmitting only within certain fixed beam where the user locates, that is, reflecting the base band signals of the fixed beams for this user to one certain corresponding sector of the base band chips;

if the user locates among several beams, selecting one or several narrow beams according to strengths of several user signals of beams received to transmit service data of the user, that is, reflecting the base band signals of the user to one or several corresponding sectors of the base band chips.

22. The method for realizing beam-forming in CDMA system of claim 19, wherein, in said step one:

when transmitting in a common channel of each user, transmitting information of this channel in every fixed beam, that is, reflecting the information of the common channel to every sector of the base band chips.

23. The method for realizing beam-forming in CDMA system of claim 19, wherein, accomplishing the process of said step two in the base band chips; or accomplishing the process of said step two by digital logic components after the base band chips, that is, accomplishing in the base band.

* * * * *